July 24, 1934. F. E. RICH ET AL. Re. 19,254

DELIVERY MECHANISM FOR PRINTING PRESSES

Original Filed Oct. 2, 1925 4 Sheets-Sheet 1

Witness,
R. Burkhardt.

Inventors:
Frank E. Rich,
Fred C. Burdick,
By Wilkinson, Huxley, Byron & Knight
Attys.

July 24, 1934. F. E. RICH ET AL Re. 19,254

DELIVERY MECHANISM FOR PRINTING PRESSES

Original Filed Oct. 2, 1925 4 Sheets-Sheet 2

Inventors:
Frank E. Rich,
Fred C. Burdick,
By Wilkinson Huxley Byron & Knight
Attys.

Witness:
R. Burkhardt.

July 24, 1934. F. E. RICH ET AL Re. 19,254

DELIVERY MECHANISM FOR PRINTING PRESSES

Original Filed Oct. 2, 1925 4 Sheets-Sheet 3

Witness:
R. Burkhardt.

Inventors:
Frank E. Rich,
Fred C. Burdick,
By Milburn Husley, Ryan & Knight
Attys.

July 24, 1934. F. E. RICH ET AL Re. 19,254
DELIVERY MECHANISM FOR PRINTING PRESSES
Original Filed Oct. 2, 1925 4 Sheets-Sheet 4
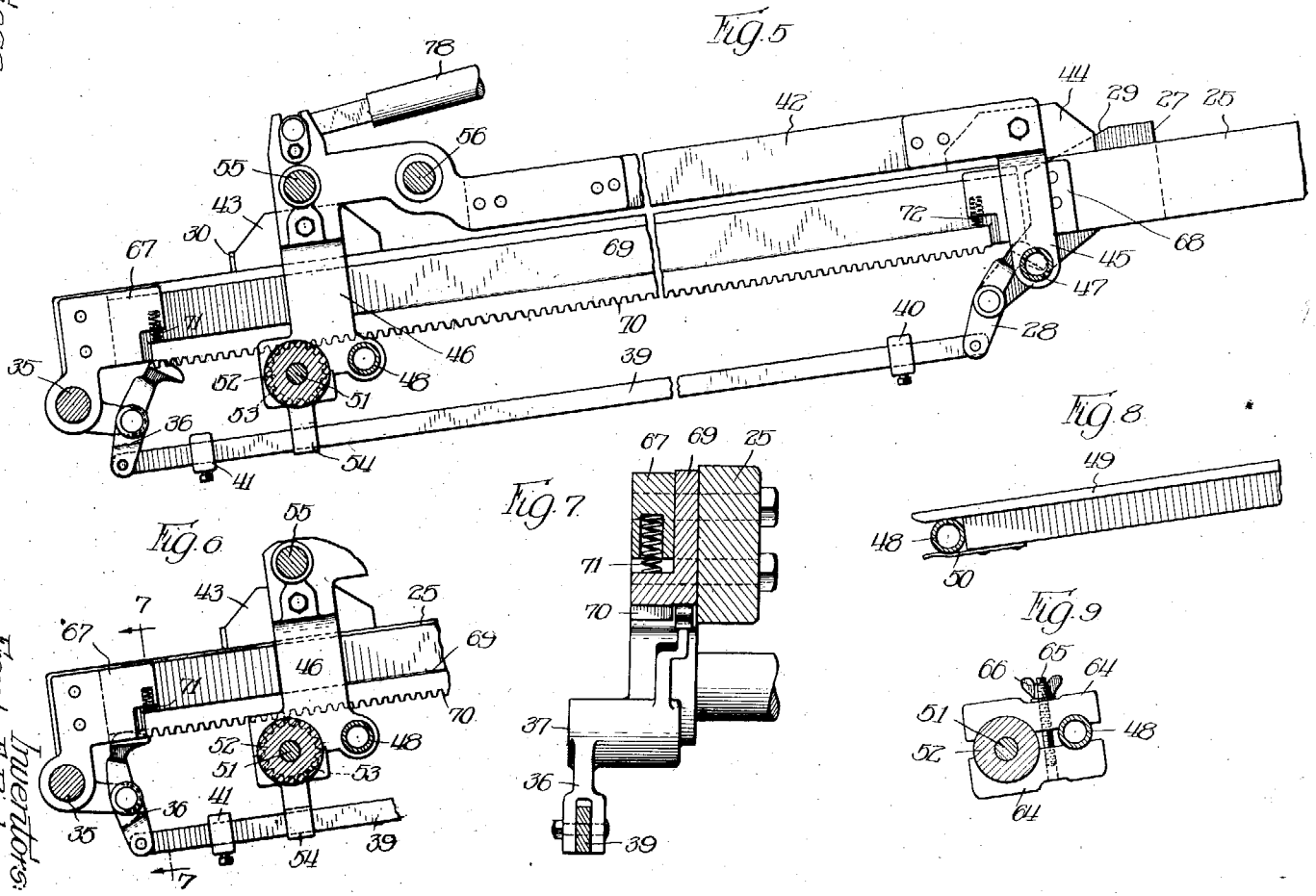
Witness:
P. Burkhardt.
Inventors:
Frank E. Rich,
Fred C. Burdick,
By Wilkinson Huxley Byron & Knight
Attys.

Reissued July 24, 1934

Re. 19,254

UNITED STATES PATENT OFFICE 19,254

DELIVERY MECHANISM FOR PRINTING PRESSES

Frank E. Rich, Chicago, and Fred C. Burdick, La Grange, Ill., assignors to The Miehle Printing Press and Manufacturing Company, Chicago, Ill., a corporation of Illinois Original No. 1,663,815, dated March 27, 1928, Serial No. 60,031, October 2, 1925. Application for reissue March 26, 1930, Serial No. 439,231

16 Claims. (Cl. 271—84)

The present invention relates to a new and improved delivery mechanism for use with printing or cutting and creasing presses or the like, and more particularly to mechanism especially adapted for the handling of heavy stock.

Heretofore, with machines of this type handling heavy stock such as pasteboard or the like, difficulties have been experienced at the delivery end of the machine. The stock rapidly accumulates at the delivery end and is heavy and cumbersome to handle and was not delivered to a position convenient for handling by the operator. The speed of the machine was therefore reduced as it was necessary to stop the machine at relatively short intervals for the removal of stock worked upon.

It is an object of the present invention to provide means for the delivery of worked stock whereby the stock can be readily removed without interfering with the operation of the machine.

It is a further object to provide stock delivery receiving means from which the stock may be easily removed with the aid of gravity.

It is an additional object to provide a mechanism of this character in which the delivered sheets may be temporarily retained as desired, upon an intermediate portion of the mechanism.

It is also an object to provide a mechanism which is relatively simple in design and adapted for commercial production and operation.

Other and further objects will appear as the description proceeds.

We have illustrated a preferred embodiment of our invention in the accompanying drawings, in which—

Figure 5 is a fragmentary view partly broken away, taken on line 5—5 of Figure 2, showing the delivery roll operating mechanism;

Figure 6 is a fragmentary view of a portion of Figure 5 showing the mechanism in another position;

Figure 7 is a section taken on line 7—7 of Figure 6 and on an enlarged scale;

Figure 8 is a fragmentary view showing the method of securing the slats to the reciprocating frame;

Figure 9 is a fragmentary section taken on line 9—9 of Figure 2; and

Figure 10 is a fragmentary view similar to a portion of Figure 1, but showing a modified form of construction.

Figure 1:
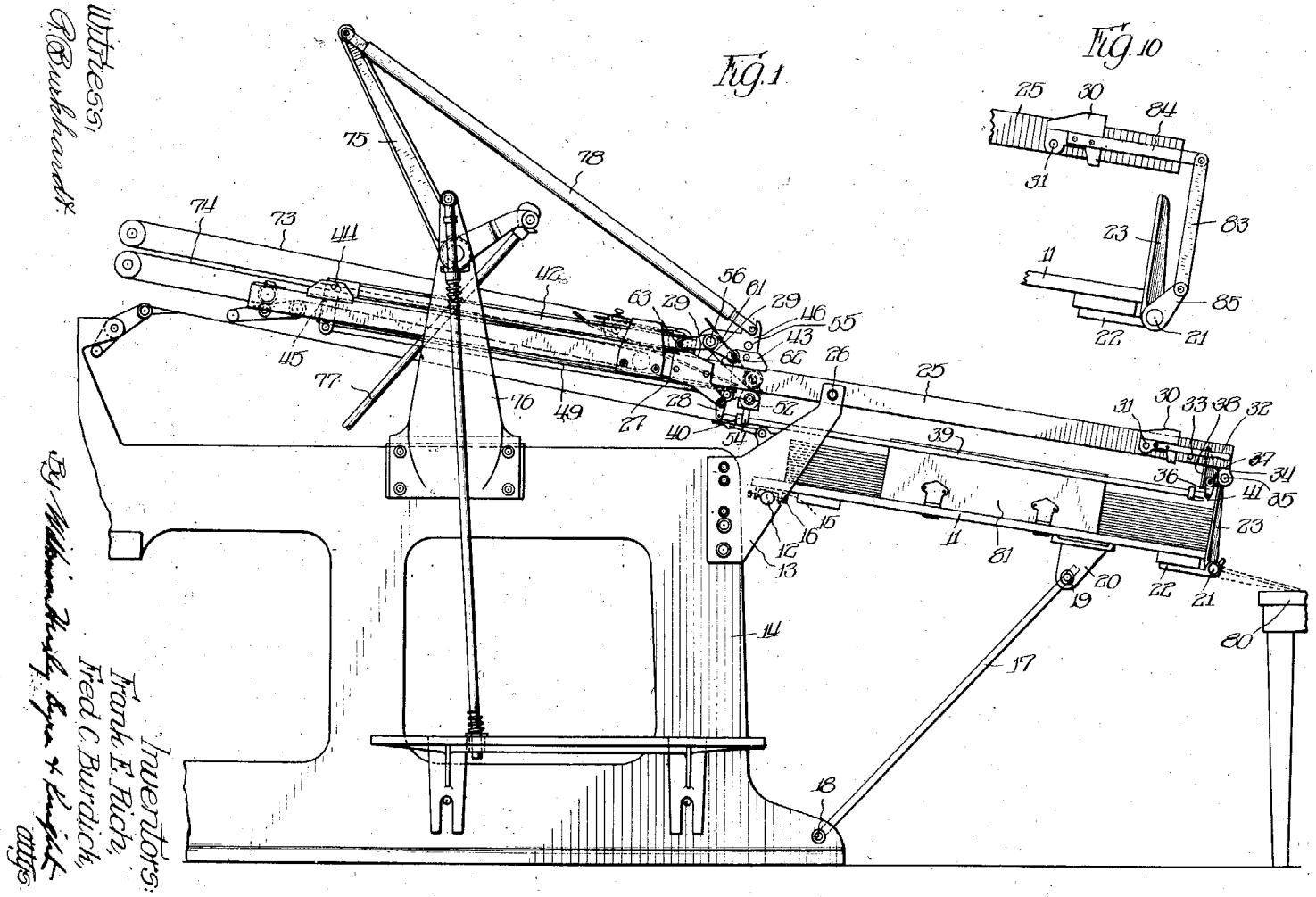
Figure 1 is a side elevation of a portion of a press with our invention attached thereto.

The delivery table 11 is supported at one end upon the cross bar 12 carried by the brackets 13 secured to the end of the press frame 14. The channel iron 15 rests upon the bar 12 and carries the set screws 16 by means of which the table may be adjusted and held in adjusted position. The outer end of the table is supported by the rods 17, the lower ends of which are pivotally supported at 18 in the end of the press frame. The upper ends of the rods 17 are adjustably secured to the lugs 19 carried in the brackets 20 located on the lower side of the table 11. The table is provided with the adjustable side guides 81.

The outer edge of the table 11 carries the shaft 21 secured thereto by brackets 22. This shaft 21 has keyed thereto the stop members 23. The shaft is normally held in position with the stop members at right angles to the table by means of the coil spring 24. The track members 25 and 25′ are supported from the upper ends of the brackets 13 and 13′ by the bolts 26 and 26′ respectively. The track member 25 carries the cam member 27 to the lower end of which is pivotally secured the cam rocker 28. The upper portion of the member 27 is provided with the cam surface 29. The outer end of the track member 25 carries the cam member 30 pivotally secured thereto at 31. The member 30 is provided with a flexible handle 32, which normally rests upon the pin 33.

The hangers 34 at the outer ends of the track members 25 and 25′ carry the cross rod 35, and the hanger 34 on member 25 also supports the cam rocker 36 which is pivoted about the point 37. The rod 35 carries the stop members 38. The cam rockers 28 and 36 carry the rod 39 pivotally supported between them. This rod carries the stop members 40 and 41 which are adjustably secured to the rod by set screws.

Figure 2:
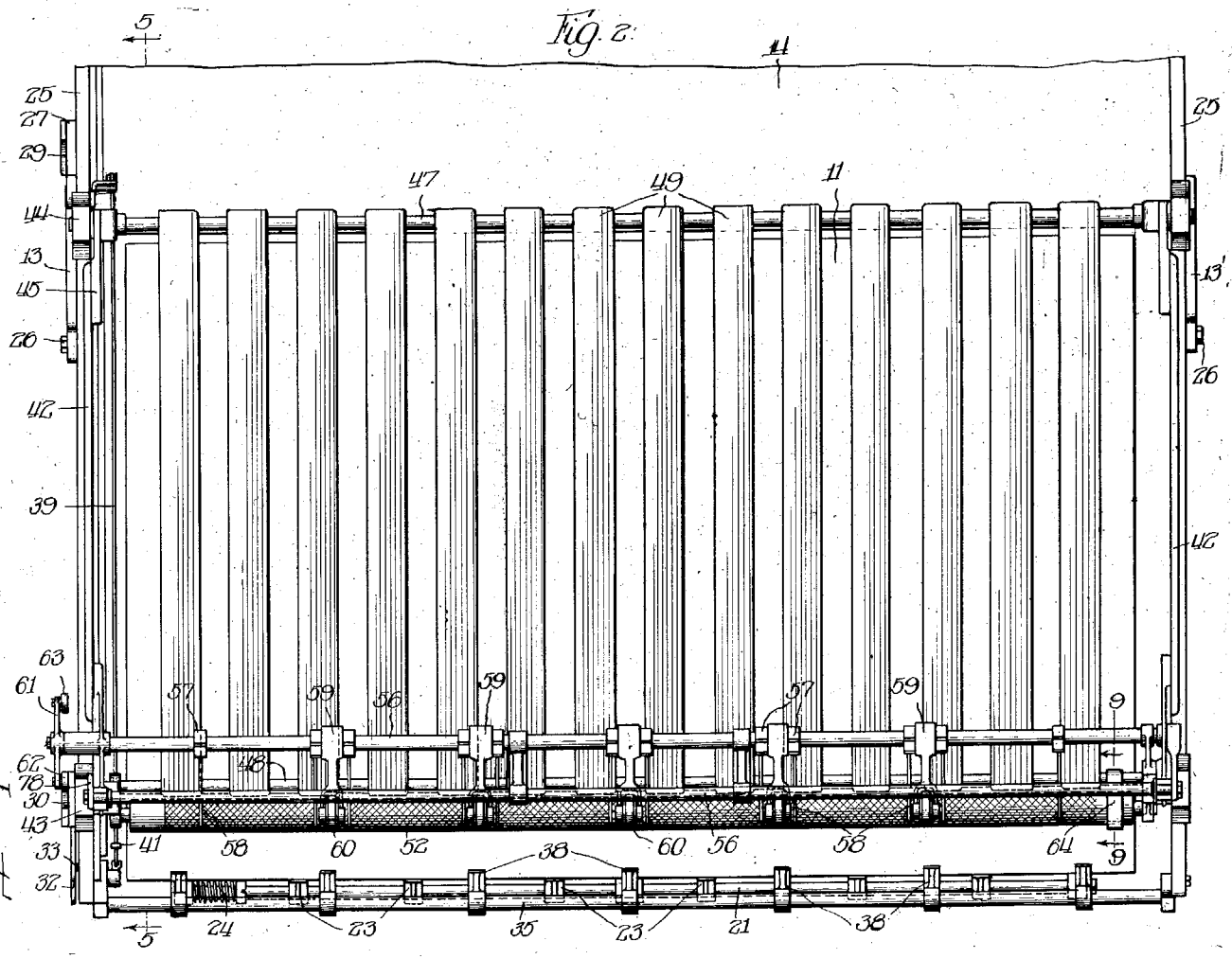
Figure 2 is a plan view of the delivery mechanism.

The reciprocated delivery carriage is best shown in Figures 2 and 5. The side frames 42 and 42′ are supported from the blocks 43 and 44 which rest on the tracks 25 and 25′. The side frames have the downwardly depending portions 45 and 46 which extend on the inner sides of the track members and which support the cross frame members 47 and 48 respectively. The slats 49 are supported upon these frame members 47 and 48. The method of connection of the slats 49 is shown in detail in Figure 8, the spring member 50 engaging the under side of the cross frame member and yieldingly holding the slat in place.

The downwardly depending portions 46 of the side frames 42 and 42' have journaled therein the shaft 51. The knurled roller 52 is carried by the shaft 51 and this shaft also carries the gear wheel 53. The lower end of the portion 46 of frame 42 is provided with a lug 54 adapted to engage the members 40 and 41 in the operation of the machine. The side frame members 42 are rigidly cross connected by the cross frame member 55. They are also cross connected by the rock shaft 56. To the rock shaft 56 are fixedly secured the stop finger carriers 57 which carry the stop fingers 58. The roller arms 59 are carried upon the shaft 56 in such manner as to rotate freely thereon and they carry at their lower ends rollers 60 which normally rest upon the knurled roller 52.

The outer end of the shaft 56 has keyed thereto the bell crank lever 61 which is provided with the cam rollers 62 and 63 adapted to cooperate with the cam surfaces 29 and 30. The cross frame member 48 as shown in detail in Figure 9, carries the brake members 64 adjustably held together by the bolt 65 and wing nut 66. These brake members engage the end of the knurled roller 52 and prevent overrunning of the roller.

As shown in Figures 5 to 7, the track member 25 has secured to the opposite ends thereof the guide members 67 and 68. These members together with the track member guide the vertical movement of the rack member 69. This member 69 is provided on its lower surface with the rack 70. It is urged downwardly by the springs 71 and 72 housed in bores in the guide members 67 and 68. The rack member 69 is held against downward movement by the cam rockers 28 and 36.

The press is provided with mechanism including belts 73 and 74 for delivering the sheets to the reciprocating carriage. This mechanism, however, forms no part of the present invention. The bell crank lever 75 is supported from the press frame upon the bracket 76. A rocking motion is given this bell crank lever by means of the rod 77 from another moving element of the press, not shown. The long arm of the bell crank lever is connected by the rod 78 with the reciprocating carriage. It will be understood that this drive properly coordinates the movement of the carriage with the delivery of sheets from the press.

In the operation of the press, the sheets are delivered from between the belts 73 and 74 onto the slats 49 of the reciprocating carriage. The forward edge of the sheet is engaged by hooks 58 and its forward movement limited. This forward edge will be gripped between the knurled roll 52 and the rollers 60. The carriage moves downwardly to the right as seen in Figure 1 under power supplied by the rods 78. This movement is coordinated with the feed of the sheet between the belts 73 and 74.

It will be noted that as the carriage moves downwardly the rack member 69 is in the position shown in Figure 6 and the rack 70 does not mesh with the gear 53. The roller 52 is held against rotation by the brake members 64. As the reciprocating carriage reaches the end of its movement, the cam roller 62 rides up on the surface of the cam 30 which rocks the shaft 56. This rocking movement of the shaft 56 lifts the stop fingers 58 out of engagement with the end of the sheet.

Figure 3:
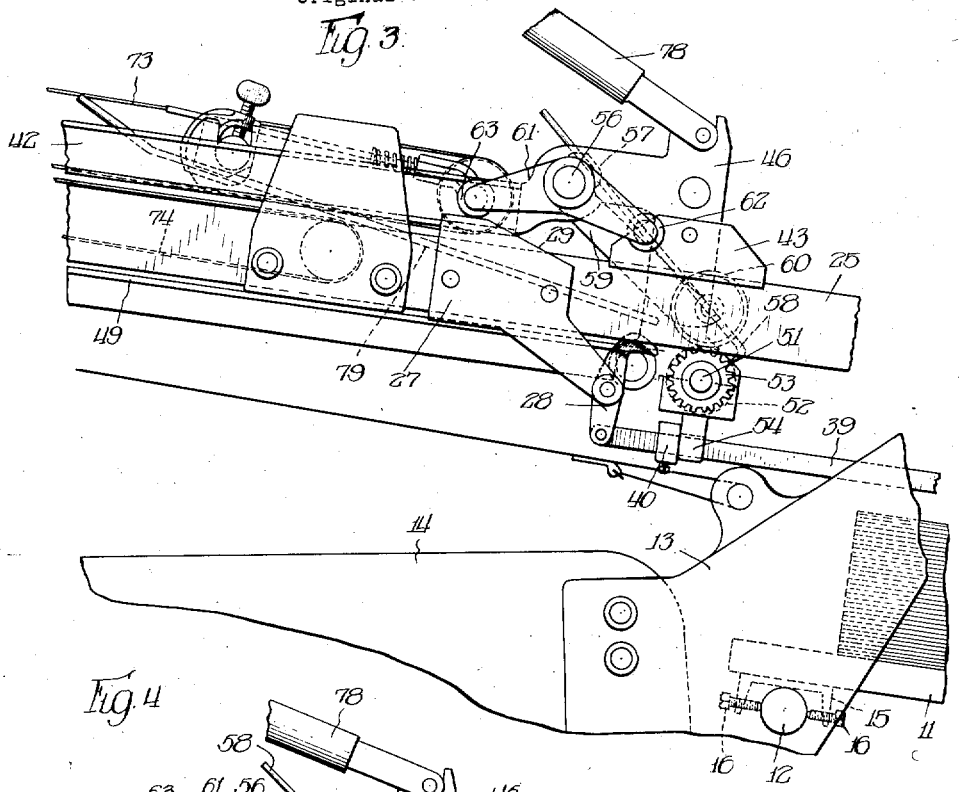
Figure 3 is a fragmentary view on an enlarged scale showing a portion of the mechanism at the inner end of its stroke.
Figure 4:
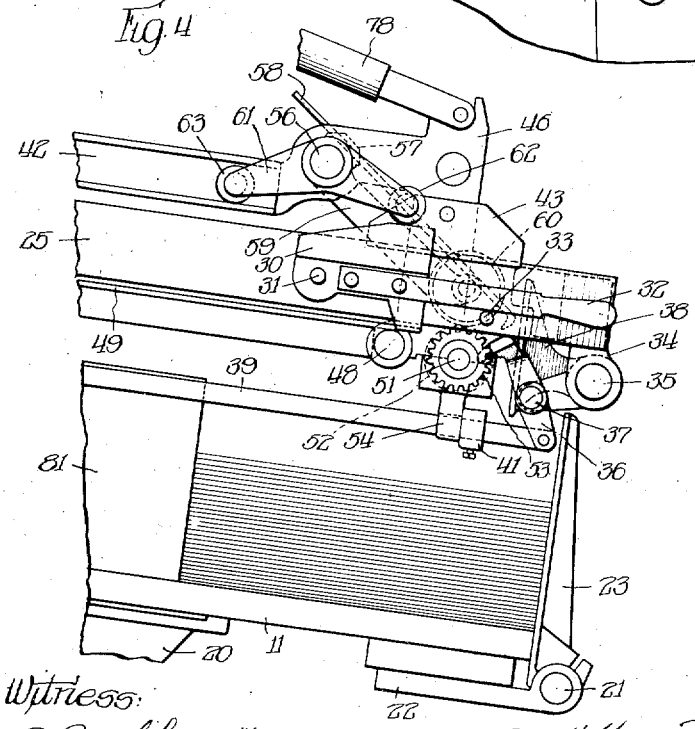
Figure 4 is a fragmentary view on an enlarged scale showing a portion of the mechanism at its outer limit of movement.

Also, at this end of the stroke the lug 54 engages the adjustable stop member 41 which moves the rod 39 longitudinally and rocks the two cam rockers 28 and 36. They are moved to the position in which they are shown in Figure 5. The rack member 69 is forced downwardly by the springs 71 and 72 and the rack meshes with the gear 51. The carriage now starts on its reverse movement back toward the press and as it so moves the knurled roller is rotated in the clockwise direction as seen in Figures 1, 3 and 4. This rotation of the roller feeds the sheet off of the end of the reciprocating carriage onto the pile resting on the receiving table 11. The sheet engages the stops 38 and drops below them and upon the pile and engages the stops 23.

As the carriage reaches its upper end of movement the cam roller 63 rides up on the cam surface 29 and rocks the shaft 56. This brings the stop fingers 58 down to their lower position and into the path of the next sheet to be delivered from the press to the carriage. Also, the lug 54 engages the adjustable stop member 40 carried by rod 39 and swings that rod to the left as seen in Figures 1, 3 and 4 and to the right as seen in Figures 5 and 6. This movement swings the cam rockers and forces the rack member 69 upwardly so that the rack 70 clears the gear 53. Rotation of the roller is promptly stopped by the friction grip of the brake members 64.

The operation continues in this manner, the sheets being piled on the table 11. When it is desired to remove sheets from the table, the stop members 23 are swung downwardly as indicated in broken lines in Figure 1, and the pile of sheets may be easily slid by gravity onto the stripping table 80. As soon as the pile has cleared, then the stops 23 swing upwardly due to the spring 24.

In presses of the class used for cutting and creasing carton blanks which are of heavy stock and which accumulate rapidly on the delivery board, it has been found desirable to so arrange the delivery means that the front edge of a pile of delivered blanks will be presented at a height convenient to the operator in order that such pile or portions thereof may be readily removed periodically during the operation of the press and onto a stripping table without undue loss of time and without interrupting the working of the press.

If it is desired to stop the deposit of sheets on the table 11 during the removal of a pile onto the stripping table, this may be accomplished without stopping the press or the delivery mechanism. In the form of construction shown in Figure 1, the flexible handle 32 is swung outwardly to clear the stop 33 and then swung downwardly, the cam member 30 rotating about the pivot 31. This brings the cam surface level with the top of the track member 25 and out of the path of the cam roller 62. Consequently, the shaft 56 is not rotated at the end of the stroke and the stop fingers 58 remain in the path of the sheet. The sheet is, therefore, not delivered from the carriage during the return movement of the carriage, but is carried back toward the press. The succeeding sheet is delivered on top of this sheet upon the carriage. When the table 11 is cleared, the cam 30 is raised to its operating position and on the next stroke the several sheets on the carriage are together deposited on the table.

In the form of construction shown in Figure 10, the cam 30 is automatically swung down out of the path of the cam roller 62 when the stops 23 are swung downwardly to permit the removal of the sheets from the table. This is accomplished by the link 83 which is pivotally connected to the bar 84 secured to the cam 30, and the arm 85 which is fixedly secured to the shaft 21 and pivotally connected to the lower end of the link 83. When the stops 23 are permitted to swing upwardly, the cam 30 is automatically restored to its operative position and the sheets upon the carriage are delivered to the table upon the next return stroke of the carriage.

We have illustrated one preferred form of our invention by way of example, but it is to be understood that we contemplate such changes and modifications as come within the spirit and scope of the accompanying claims.

We claim:

1. In combination with the other elements of a press or the like, a reciprocating delivery frame, means to deliver sheets to the reciprocating frame, stop means carried by the frame and adapted to retain sheets thereon, means adapted to move the stop means to release the sheets at a predetermined point in the operation, and means adapted selectively to prevent release by the stop means.

2. In combination with the other elements of a press or the like, a reciprocating delivery frame, means to deliver sheets to the reciprocating frame, a delivery roller carried by the frame, a gear adapted to drive said roller, a rack adapted to mesh with the gear, and means adapted to throw the rack into and out of engagement with the gear.

3. In combination with the other elements of a press or the like, a reciprocating delivery frame, means to deliver sheets to the reciprocating frame, a delivery roller carried by the frame, a gear adapted to drive said roller, a rack adapted to mesh with the gear, and means operated by the movement of the frame adapted to throw the rack into and out of engagement with the gear.

4. In combination with the other elements of a press or the like, a reciprocating delivery frame, means to deliver sheets to the reciprocating frame, a delivery roller carried by the frame, a gear adapted to drive said roller, a rack adapted to mesh with the gear, said rack being carried by a fixed portion of the mechanism, cam means adapted to move the rack relative to the gear, and means carried by the frame adapted to actuate the cam means.

5. In combination with the other elements of a press or the like, a reciprocating delivery frame, means to deliver sheets to the reciprocating frame, a delivery roller carried by the frame, a gear adapted to drive said roller, a rack adapted to mesh with the gear, said rack being carried by a fixed portion of the mechanism, springs normally urging the rack into engagement with the gear, and cam means adapted to move the rack away from the gear.

6. In combination with the other elements of a press or the like, a reciprocating delivery frame, means to deliver sheets to the reciprocating frame, stop means carried by the frame and adapted to retain sheets thereon, cams carried by a fixed portion of the mechanism, and operating means carried by the frame adapted to be engaged by the cams to move the stop means into and out of operative position.

7. In combination with the other elements of a press or the like, a reciprocating delivery frame, means to deliver sheets to the reciprocating frame, stop means carried by the frame and adapted to retain sheets thereon, cams carried by a fixed portion of the mechanism, operating means carried by the frame adapted to be engaged by the cams to move the stop means into and out of operative position, and means adapted to selectively move one of said cams out of the path of the operating means.

8. In combination with the other elements of a press or the like, a reciprocating delivery frame, means to deliver sheets to the frame, a table adapted to receive sheets from the frame, stop means retaining sheets on the table, stop means carried by the delivery frame and adapted to retain sheets thereon, means to release said delivery frame stop means, and an operative connection between said release means and the table stop means.

9. In combination with the other elements of a press or the like, a reciprocating delivery frame, means to deliver sheets to the frame, a table adapted to receive sheets from the frame, stop means retaining sheets on the table, stop means carried by the delivery frame and adapted to retain sheets thereon, means to release said delivery frame stop means, and a linkage connection between the release means and table stops, whereby the release means is rendered inoperative when the table stops are move to permit removal of sheets.

10. In combination with the other elements of a cutting and creasing press or the like, a sheet conveyor, a work table, inclined sheet supporting means adapted to receive sheets from said conveyor, sheet stops mounted at the lower end of said supporting means and arranged to be swung down so that a stack of deposited sheets is adapted to be removed from said supporting means and transferred over said stops onto said work table, and means whereby sheets will be prevented from reaching said supporting means when said stops are swung down.

11. In combination with the other elements of a cutting and creasing press or the like, a sheet conveyor, a work table, inclined adjustable sheet supporting means adapted to receive sheets from said conveyor, sheet stops mounted at the lower end of said supporting means and arranged to be swung down so that a stack of deposited sheets is adapted to be removed from said supporting means and transferred over said stops onto said work table, and means whereby sheets will be prevented from reaching said supporting means when said stops are swung down.

12. In combination with the other elements of a cutting and creasing press or the like, a sheet conveyor, a work table, inclined adjustable sheet supporting means adapted to receive sheets from said conveyor, sheet stops resiliently mounted at the lower end of said supporting means and arranged to be swung down so that a stack of deposited sheets is adapted to be removed from said supporting means and transferred over said stops onto said work table, and means whereby sheets will be prevented from reaching said supporting means when said stops are swung down.

13. In combination with the other elements of a cutting and creasing press or the like, a reciprocating sheet conveyor, a work table, inclined adjustable sheet supporting means adapted to receive sheets from said conveyor, sheet stops mounted at the lower end of said supporting means and arranged to be swung down so that a stack of deposited sheets is adapted to be removed from said supporting means with the assistance of gravity and transferred over said stops onto said work table, and means whereby sheets will be prevented from reaching said supporting means when said stops are swung down.

14. In combination with the other elements of a cutting and creasing press or the like, a sheet conveyor, a sheet supporting member adapted to receive sheets from said conveyor, movably mounted sheet stops, and means controlled by the movement of said sheet stops for preventing sheets from being deposited onto said supporting member.

15. In combination with the other elements of a cutting and creasing press or the like, a sheet conveyor, a sheet supporting member adapted to receive sheets from said conveyor, movably mounted sheet stops, and means adapted to be actuated during the operation of the press and controlled by the movement of said sheet stops for preventing sheets from being deposited onto said supporting member.

16. In combination with the other elements of a cutting and creasing press or the like, a reciprocating sheet conveyor, an inclined sheet supporting member adapted to receive sheets from said conveyor, movably mounted sheet stops carried by said supporting member and adapted to be swung down, and means controlled by the movement of said sheet stops for preventing sheets from being deposited onto said supporting member when said stops are swung down.

FRANK E. RICH.
FRED C. BURDICK.